United States Patent [19]

Budinski

[11] 4,257,569

[45] Mar. 24, 1981

[54] POWER SEAT ADJUSTING MECHANISM FOR A PLATFORM SEAT

[75] Inventor: John A. Budinski, Dayton, Ohio

[73] Assignee: General Motors Corporation, Detroit, Mich.

[21] Appl. No.: 60,885

[22] Filed: Jul. 26, 1979

[51] Int. Cl.³ .............................................. B60N 1/02
[52] U.S. Cl. ................................... 248/394; 248/396
[58] Field of Search ............... 248/393, 394, 396, 421

[56] References Cited

U.S. PATENT DOCUMENTS

| | | | |
|---|---|---|---|
| 2,930,428 | 3/1960 | DeRose | 248/394 |
| 3,033,510 | 5/1962 | Hollar et al. | 248/394 |
| 3,182,947 | 5/1965 | Tanaka | 248/396 X |
| 3,240,464 | 3/1966 | Pickles | 248/394 X |
| 3,527,438 | 9/1970 | White | 248/396 |
| 3,552,707 | 1/1971 | Tanaka | 248/394 |

Primary Examiner—Francis K. Zugel
Attorney, Agent, or Firm—Donald F. Scherer

[57] ABSTRACT

A seat adjusting mechanism has two vertical and one horizontal drive systems that are power actuated to control the attitude of the seat. The vertical drive systems are disposed between a seat support and a seat base which is connected to the seat support by a hinged link. The horizontal drive system is mounted on the seat support and is operable to move a seat platform relative to the seat support.

4 Claims, 5 Drawing Figures

POWER SEAT ADJUSTING MECHANISM FOR A PLATFORM SEAT

This invention relates to seat adjustment mechanisms and more particularly to power operated seat adjuster mechanisms.

It is an object of this invention to provide an improved seat adjuster mechanism having a pair of vertical drive systems connected between a seat base and a vertically movable seat support which are interconnected by a hinged element and a horizontal drive system disposed on the seat support and drivingly connected to a horizontally movable seat platform.

It is another object of this invention to provide an improved power seat adjusting mechanism having a base member and a support member interconnected by a link which is hinged at spaced locations to both members and wherein a pair of vertical drive mechanisms each having an electric motor housed in a support member and a screw actuator for adjusting the attitude of the seat are connected between the support member and base member and a horizontal drive mechanism housed in the support member and drivingly connected to a platform member slidably disposed on the support member for horizontal adjustment of the platform member relative to the support member.

These and other objects and advantages of the present invention will be more apparent from the following description and drawings in which.

Figure 1:
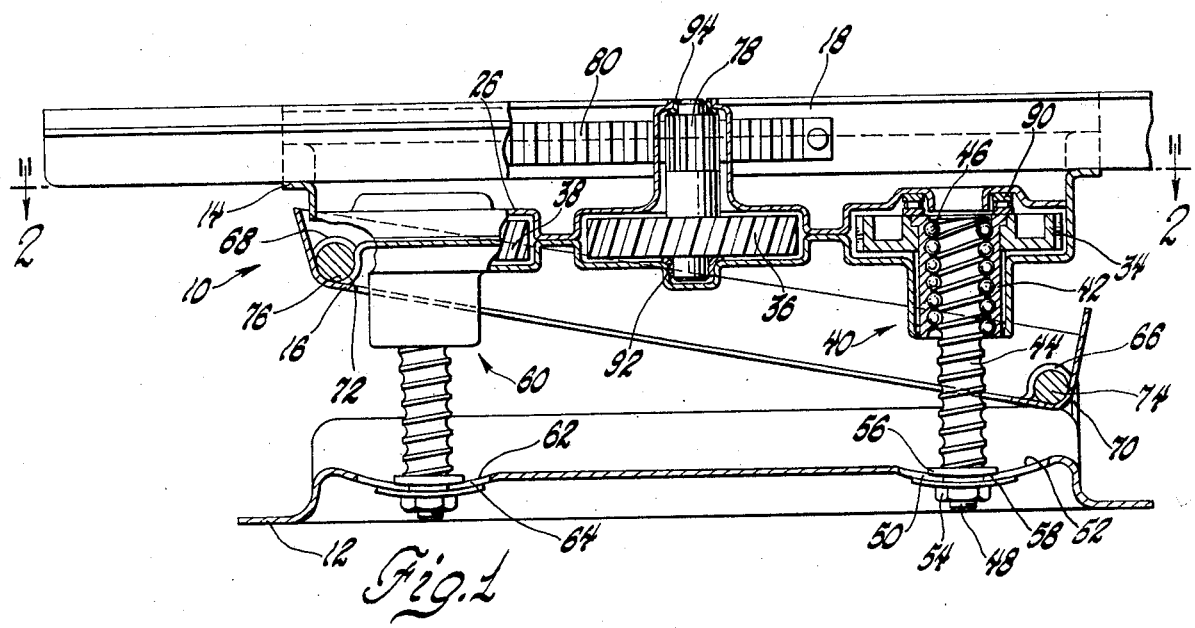
FIG. 1 is an elevational view partly in section of a seat adjusting mechanism.
Figure 2:
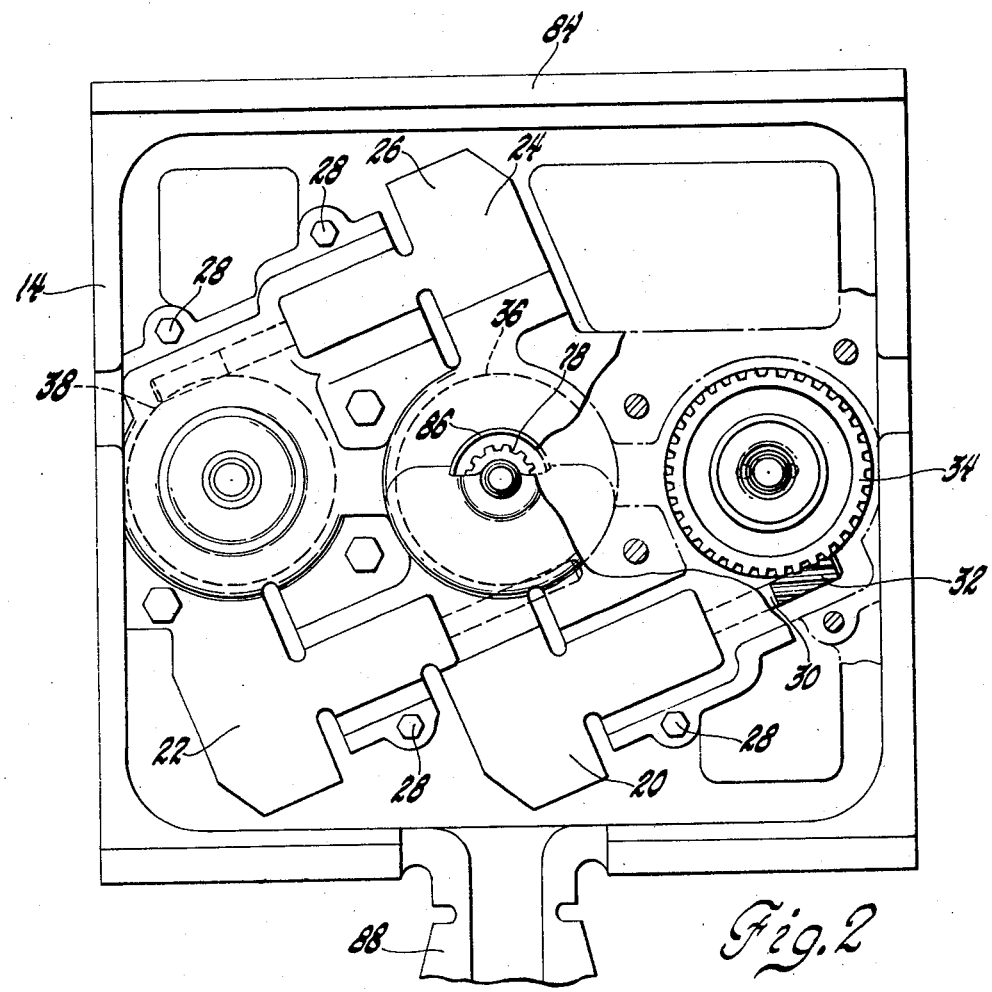
FIG. 2 is a view taken along line 2—2 of FIG. 1.
Figure 3:
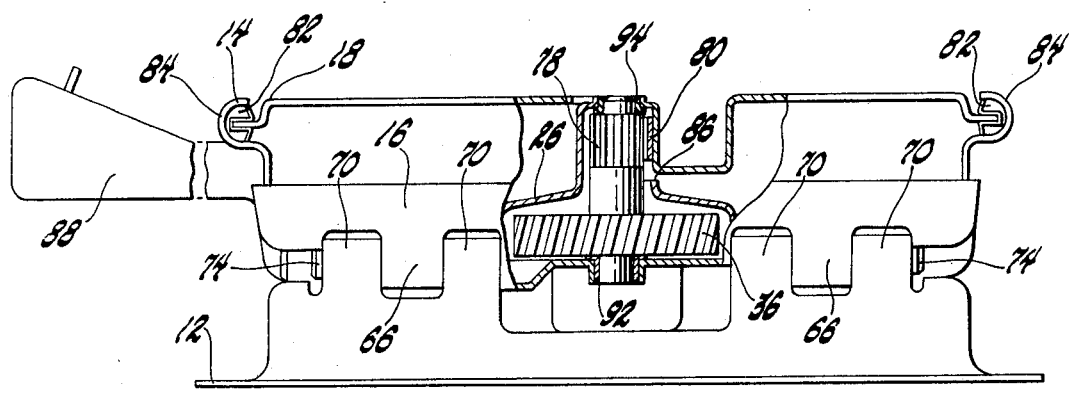
FIG. 3 is a view partly in section taken along line 3—3 of FIG. 4.

Referring to the drawings wherein the same characters represent the same or corresponding parts throughout the several views, there is seen in FIG. 1 a vehicle seat mechanism, generally designated 10, and including a base 12 adapted to be connected to a stationary portion of a vehicle, not shown, a seat support member 14, a hinged link 16 interconnecting the base 12 and the seat support 14 and a seat platform 18 which, as seen in FIG. 3, is slidably disposed in the seat support 14. The seat support member 14 houses three electrical drive units 20, 22 and 24, which are preferably direct current permanent magnet electric motors which can be constructed in accordance with such well-known devices.

The electric motors 20, 22 and 24 each have a portion of their housing stamped into the seat support 14 and the other half of the housing is incorporated in a cover plate 26 which is fastened to the seat support 14 by a plurality of fasteners, such as 28. Each motor, such as 20, has a drive shaft 30 on which is formed a worm 32 which meshes with a worm gear 34. The motor 22 is operable to drive a worm gear 36 and the motor 24 is operable to drive a worm gear 38. The worm gear 34 is an input drive member for a ball nut and screw actuator, generally designated 40, which includes a nut portion 42 secured to the gear 34 and a substantially vertical screw portion 44 which is threadably engaged with the nut 42 by a plurality of balls 46 in a well-known manner.

The screw 44 has a threaded end portion 48 which passes through a slot 50 formed in a curved portion 52 of the base 12. The screw 44 is secured in the slot 50 by a fastener 54 threaded on the portion 48 and a washer 56 which has a curved surface 58 complementary to the curve of surface 52. As is well-known with ball nut and screw actuators, when the input or nut is rotated and the screw is substantially fixed, the nut will traverse along the screw. Therefore, depending upon the direction of rotation of worm gear 34, the nut 42 will traverse along the screw 44 thus raising and lowering the portion of the seat to which the actuator 40 is secured.

For the purpose of this discussion, it will be assumed that the actuator 40 is connected to the rear of the seat support 14. A second ball nut and screw actuator 60, identical in construction with the ball nut and screw actuator 40, is disposed at the forward end of the seat support 14 and is connected to the base 12 at a curved surface 62 through a slot 64 in a manner similar to that described for the ball nut and screw actuator 40.

Figure 4:
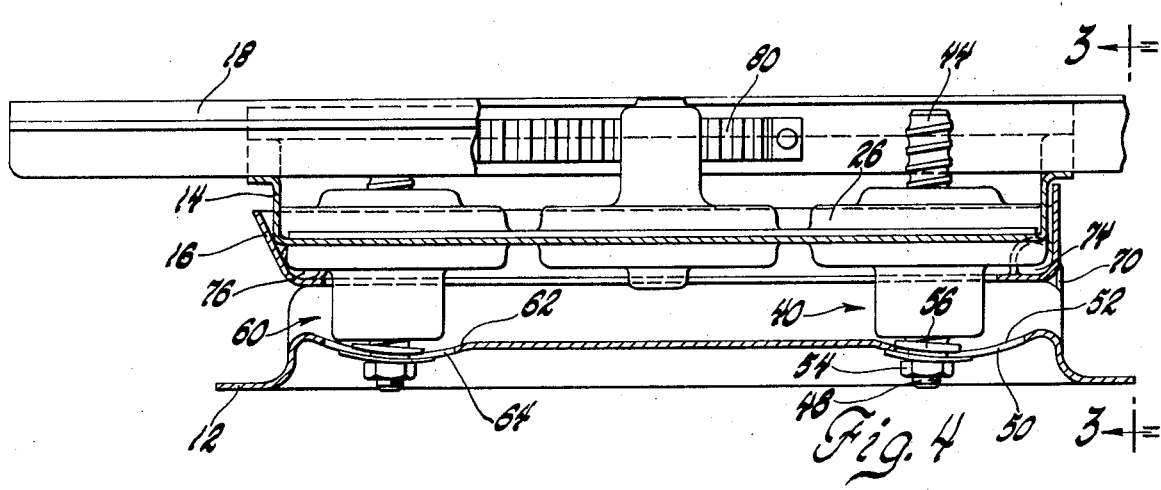
FIG. 4 is a side elevational view showing the seat mechanism in a fully retracted position.
Figure 5:
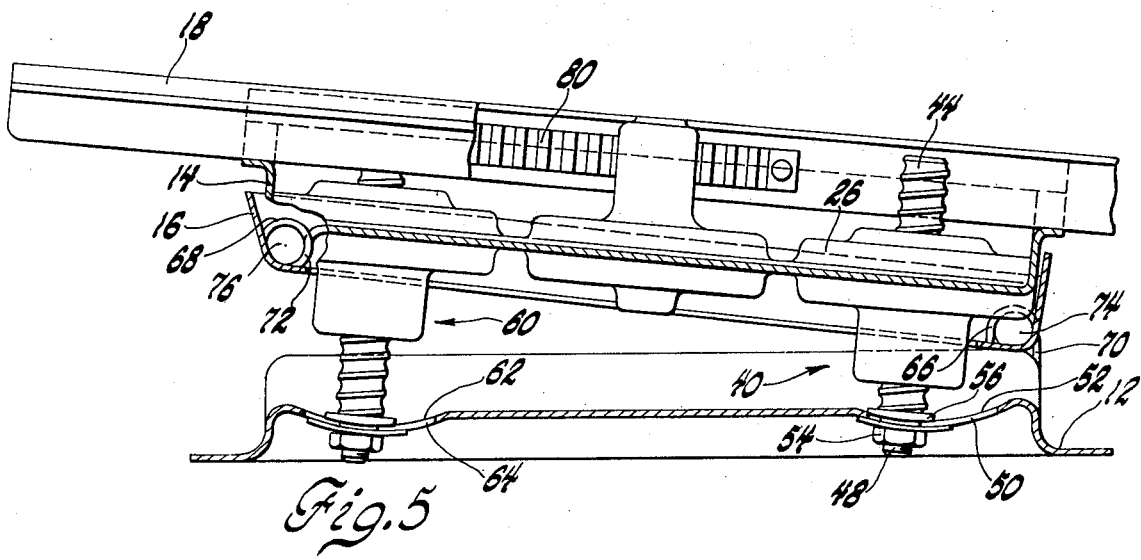
FIG. 5 is a side elevational view showing the seat mechanism in a partially elevated position.

As can be seen in FIGS. 4 and 5, the curved surface 52 and slot 50 permit the ball nut and screw actuator 40 to adjust from vertical relative to the base 12 when the seat support 14 and platform 18 are positioned out of a horizontal attitude. Likewise, it will be seen that slot 64 and surface 62 permit the ball nut and screw actuator 60 to adjust relative to the base 12.

The base 12 and seat support 14 are interconnected by a hinged link 16 which is substantially a rectangular structure with the central portion thereof removed. The link 16 has formed thereon hinge structures 66 at the rear and 68 at the front which cooperate with hinge structures 70 formed on the base 12, and 72 formed on the support 14. The hinge structures 66 and 70 are interconnected by pins 74 and the hinge structures 68 and 72 are interconnected by pins 76. As seen in FIG. 3, the hinge structures 66 and 70 are preferably spaced outboard of a plane passing through the centerline of the worm gears.

The worm gear 36 has secured thereto a pinion gear 78 which meshes with a rack gear 80 secured to the seat platform 18. The worm gear 36 and pinion 78 are rotated by the output shaft of electric motor 22 so as to drive the rack gear 80 and seat platform 18 relative to the seat support member 14. The seat platform 18 is slidably disposed in a plurality of plastic guide members 82 which are seated in semicircular curved portions 84 which form integral side rails on the seat support 14.

The cover plate 26, as well as providing part of the motor housing for the electric motors 20, 22 and 24, also provides a cover for the actuators 40 and 60 and cover for the worm 36 and pinion 78. The cover 26 has an opening 86 through which the pinion gear 78 protrudes to mesh with rack gear 80. The seat support 14 also has formed integrally therewith, a switch housing 88 which houses a plurality of conventional manually operable electric switches, not shown, which control the operation of the electric motors 20, 22 and 24 and therefore permit the operator to adjust the seat to the desired position.

The seat adjusting mechanism described herein is preferably used in a platform type seat found in van type vehicles or in "bucket" type seats found in sport cars. The adjusting mechanism provides substantially infinitely variable seat positioning within a limited range. The seat support 14 and therefore platform 18 can be raised or lowered in a horizontal position by operating both actuators 40 and 60 in the same direction simultaneously. The seat platform can be adjusted horizontally relative to the seat support by actuation of the electric motor 22. The seat can be tilted by actuation of either actuator 60 or 40 alone or by simultaneous actuation of actuators 60 and 40 in opposite directions.

A conventional seat cushion and seat back can be secured to the seat platform 18; or the seat cushion portion can be secured to the platform 18 while the seat back portion is secured to the seat support member 14. Either of these types of constructions are well-known.

As can be seen best in FIG. 1, the support bearings for the vertical actuators 40 and 60 are roller bearings 90 disposed between the worm gear 34 and the cover housing 26 and only a single vertical bearing is required since the reaction forces are always in one direction. The worm gear 36 is rotatably supported in a bearing 92 secured in the seat support 14 and the pinion gear 78 is rotatably supported in a bearing 94 secured in the cover 26. As has already been mentioned, the seat platform 18 is slidably supported on plastic bearings 82. The use of the support structures permit a very simple construction for the seat actuating mechanism described herein.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A seat adjusting mechanism comprising: a base member; a seat platform member; a seat support member slidably supporting said seat platform member; a link member hinged at first spaced locations to said base member and at second spaced locations to said seat support member at a location longitudinally displaced from the first spaced locations; first vertical drive means drivingly connected to said base member and housed in said seat support member between said first spaced hinge locations on said seat support member for raising and lowering one portion of said seat support member relative to said base member; second vertical drive means drivingly connected to said base member having the drive axis coplanar with the drive axis of the first vertical drive means disposed between said second spaced hinge locations on said base member and being housed in said seat support member for raising and lowering another portion of said seat support member relative to said base member; and single horizontal drive means housed in said seat support member and being drivingly connected to said seat platform member for moving said seat platform member linearly relaive to said seat support member, said vertical drive means and said horizontal drive means being selectively operable to position a seat within a predetermined space.

2. A seat adjusting mechanism comprising: a base member; a seat platform member; a seat support member slidably supporting said seat platform member; a link member hinged at two locations to said base member and hinged at two locations to said seat support member at respective longitudinally spaced locations; first vertical drive means including a screw actuator operatively connected to said base member and an electric drive means housed in said seat support member intermediate said two spaced hinge locations on said seat support member and operable to drive said screw actuator to raise and lower one portion of said seat support member relative to said base member; second vertical drive means including a screw actuator operatively connected to said base member and an electric drive means housed in said seat support member intermediate said two spaced hinge locations and operable to drive said screw actuator to raise and lower another portion of said seat support member relative to said base member; and single horizontal drive means housed in said seat support member and being drivingly connected to said seat platform member for moving said seat platform member linearly relative to said seat support member, said first vertical drive means, said second vertical drive means and said horizontal drive means each being selectively operable to position a seat within a predetermined space and each having a respective drive axis coplanar with both of the other drive axes.

3. A seat adjusting mechanism comprising: a base member; a seat platform member; a seat support member slidably supporting said seat platform member; a link member hinged to said base member at first spaced locations and to said seat support member at second spaced locations longitudinally of the first spaced locations; first vertical drive means having a drive axis and including a screw actuator rotatable on said drive axis and operatively connected to said base member and an electric drive means housed in said seat support member for operating said screw actuator for raising and lowering one portion of said seat support member relative to said base member; second vertical drive means having a drive axis including a screw actuator rotatable on said drive axis and operatively connected to said base member, and electric drive means housed in said seat support member for operating said screw actuator for raising and lowering another portion of said seat support member relative to said base member; and single horizontal drive means including electric motor drive means housed in said seat support member and gear means having a drive axis coplanar with the drive axis of both vertical drive means drivingly connected to said electric motor drive means, said seat platform member for moving said seat platform member linearly relative to said seat support member, said vertical drive means and said horizontal drive means being selectively operable to position a seat within a predetermined space.

4. A seat adjusting mechanism comprising: a base member; a seat platform member having rack gear means; a seat support member slidably supporting said seat platform member; a link member hinged to said base member at first spaced locations and to said seat support member at second spaced locations; first vertical drive means drivingly connected to said base member and including electric motor drive means and gear means having an axis disposed centrally of said first spaced locations and being housed in said seat support member for raising and lowering one portion of said seat support memeber relative to said base member; second vertical drive means drivingly connected to said base member and including electric motor drive means and gear means having an axis displaced longitudinally of the axis of the first mentioned gear means and being disposed centrally of said second spaced locations and being housed in said seat support member for raising and lowering another portion of said seat support member relative to said base member; and single horizontal drive means including electric motor means and gear means having an axis housed in said seat support member and being drivingly connected to said rack gear means on said seat platform member for moving said seat platform member linearly relative to said seat support member, said vertical drive means and said horizontal drive means being selectively operable to position a seat within a predetermined space said axis of each of said gear means being disposed coplanar.

* * * * *